United States Patent [19]
Heintz

[11] 3,774,463
[45] Nov. 27, 1973

[54] AUTHORITY CHANGE MECHANISM

[75] Inventor: Richard Paul Heintz, Kalamazoo, Mich.

[73] Assignee: Pneumo Dynamics Corporation, Cleveland, Ohio

[22] Filed: Mar. 27, 1972

[21] Appl. No.: 238,510

[52] U.S. Cl. .............................. 74/96, 180/79.2 A
[51] Int. Cl. ............................................ F16h 21/44
[58] Field of Search .................... 74/96, 53, 54, 55, 74/56, 834, 837, 522, 96; 180/79.2 R, 79.2 A, 79.2 B

[56] References Cited
UNITED STATES PATENTS

| | | | |
|---|---|---|---|
| 2,548,807 | 4/1951 | Morgan et al. | 74/522 |
| 2,987,135 | 6/1961 | Harvey | 180/79.2 R |
| 3,055,227 | 9/1962 | Martin | 74/97 |
| 3,312,301 | 4/1967 | Hagen | 180/79.2 R |
| 3,496,874 | 2/1970 | Findlay | 74/834 |

*Primary Examiner*—Charles J. Myhre
*Assistant Examiner*—Wesley S. Ratliff, Jr.
*Attorney*—Stephen M. Mihaly

[57] ABSTRACT

Authority change mechanism includes a relatively low ratio change mechanism interposed between an input shaft and output cam whose input range has been extended by the same factor as the ratio change mechanism. In the secondary high authority mode of operation, the same output command is achieved as in the primary mode at less input command. At higher input commands the output command in the high authority mode is greater than the maximum output in the primary mode, and by limiting use of the extended portion of the cam to the high authority mode, its configuration may be such as to increase the total output in the high authority mode by a much higher factor during high inputs for high maneuverability.

10 Claims, 6 Drawing Figures

PATENTED NOV 27 1973

AUTHORITY CHANGE MECHANISM

BACKGROUND OF THE INVENTION

This invention relates generally as indicated to an authority change mechanism for varying the ratio of input to output in a predetermined controlled manner to prevent degradation or loss of control in both the primary and secondary modes of operation under normal input commands.

For proper control of the movements of nose wheel steering systems for high speed aircraft and the like, authority change mechanisms are oftentimes used to provide more than one mode of operation for varying the functional relationship between the input and output displacement at different speeds. At relatively high speeds, the functional relationship between input and output is critical and should be kept relatively low to insure proper control, whereas at relatively low speeds, there is little or no danger of loss of control and accordingly the relationship between input and output may be increased by a relatively large factor for increased maneuverability in close quarters.

The main objection to previous authority change mechanisms was that during the secondary mode of operation they amplified the output by the same high factor for all levels of input commands. This meant that if the operator through error or signal failure inadvertently selected the secondary mode of operation at a critical time when good control sensitivity was required, there was a degradation and possible loss of control even during relatively small inputs.

The usual high ratio changers also added to the cost and size of the mechanism and suffered in accuracy and other characteristics. Objectionable interrupted or spring loaded cams or similar non-continuous or non-positive devices were also used in previous authority change mechanisms.

SUMMARY OF THE INVENTION

With the foregoing in mind, it is a principal object of this invention to provide a relatively simple and reliable authority change mechanism including a primary low authority mode of operation for critical control and a secondary high authority mode of operation for maneuverability which nevertheless also provides adequate control during normal inputs, thereby preventing loss of control even if the high authority mode is inadvertently selected during a critical period of operation.

Another object is to provide such an authority change mechanism which is more accurate and more compact than previous known mechanisms utilizing large ratio changers.

Still another object is to provide such an authority change mechanism which only slightly amplifies the input signal during the secondary mode of operation under normal input commands and substantially amplifies the input signal under high input commands.

Yet another object is to provide such an authority change mechanism whose secondary mode output does not exceed the maximum primary mode output authority until a relatively high input is commanded.

These and other objects of the present invention may be achieved by providing the authority change mechanism with a relatively low ratio changer which only amplifies the input signal by a relatively small amount. The ratio changer is placed between the input shaft and output cam, and the input range of the cam is desirably extended by the same factor as the ratio changer. During the secondary mode of operation, the maximum output command obtainable in the primary mode is achieved at less input. Beyond that point the output command is greater in the secondary mode, and by restricting the use of the extended portion of the cam only during the secondary mode of operation, its configuration may be such as to increase the total output during the secondary mode by a much higher factor at high inputs for high maneuverability.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE PREFERRED EMBODIMENT

Figure 1:
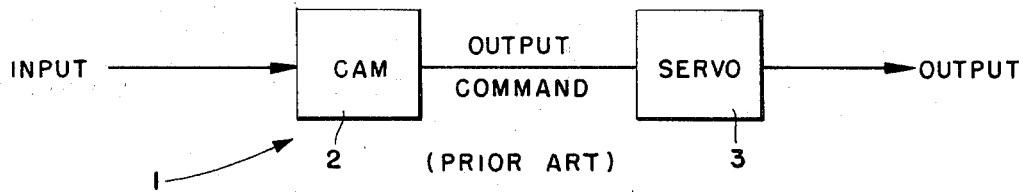
FIG. 1 is a schematic diagram of a conventional drive mechanism for obtaining a desired functional relationship between the input and output displacement in a low authority or primary mode of operation.

Referring now in detail to the drawing and initially to FIG. 1 thereof, there is schematically shown a conventional drive mechanism 1 including a cam or function generator 2 for modifying the functional relationship between the input and output displacement to obtain the desired output command for a primary mode of operation. A servo 3 may be operated by the cam 2 to cause the actual output to follow the command, overcoming any output forces which may be present.

Such a primary mode of operation may be used to control such movements as the nose gear steering system for an aircraft at high speeds when the functional relationship between the input and output displacement is critical for proper control of the aircraft.

A second high authority mode of operation is also usually provided to increase the relationship between the input and output displacement by a certain factor at low speeds for maneuvering the aircraft in close quarters.

Figure 2:
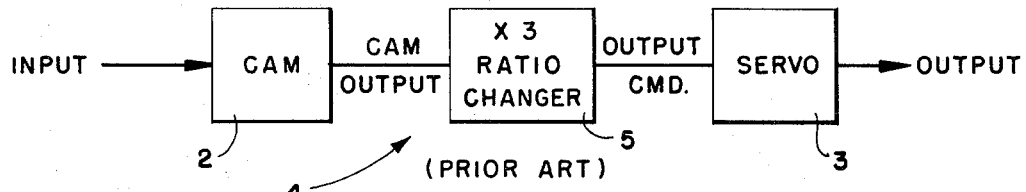
FIG. 2 is a schematic diagram of a conventional authority change mechanism including a high ratio changer for amplifying the output from the cam of FIG. 1 by a high factor during the high authority or secondary mode of operation.

A previous known authority change mechanism 4 shown in FIG. 2 achieved the desired authority change using a relatively high ratio changer 5 to amplify the output of the cam 2 of FIG. 1 by the desired factor. However, such relatively high ratio changers 5 had the disadvantage that they added to the cost and size of the device, and such high ratio changers also suffered in accuracy and other characteristics. Moreover, in the high authority mode, any input resulted in an output which was several times greater than the corresponding output in the primary mode as determined by the factor of the ratio changer.

Figure 3:
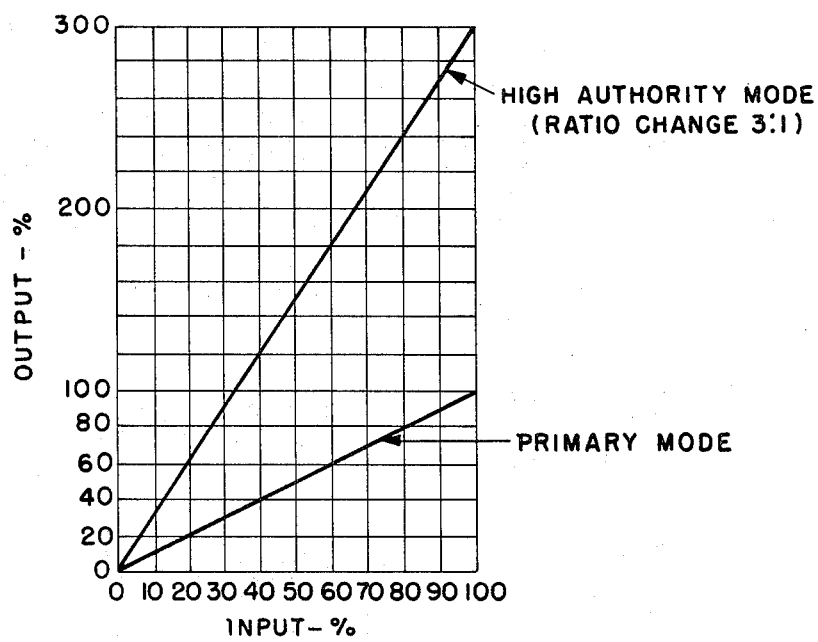
FIG. 3 is a graph showing the relative inputs and outputs obtained during the primary and secondary (high authority) modes of operation of the mechanism of FIG. 2.

The operation of the authority change mechanism 4 of FIG. 2 is schematically illustrated in FIG. 3 using a ratio change mechanism having an authority change ratio of three to one which results in an output for the high authority mode of three times the output for the primary mode for the same input. This has the disadvantage that if through operator error or signal failure the high authority mode is inadvertently selected in a critical phase of operation, it would result in three times the primary control sensitivity, even for very small inputs, resulting in degradation or possible loss of control.

To overcome the above enumerated problems the authority change mechanism of the present invention has been devised which permits the functional relationship between the input and output displacement to be exactly as specified during the primary mode of operation and provides for substantially improved control sensitivity during the high authority mode of operation. This is accomplished by using a relatively small ratio change mechanism 6 instead of the relatively high ratio change mechanism 5 previously used and placing the relatively low ratio change mechanism 6 in front of the cam or function generator 7 of the authority change mechanism 8 of the present invention as shown schematically in FIG. 4.

Figure 5:
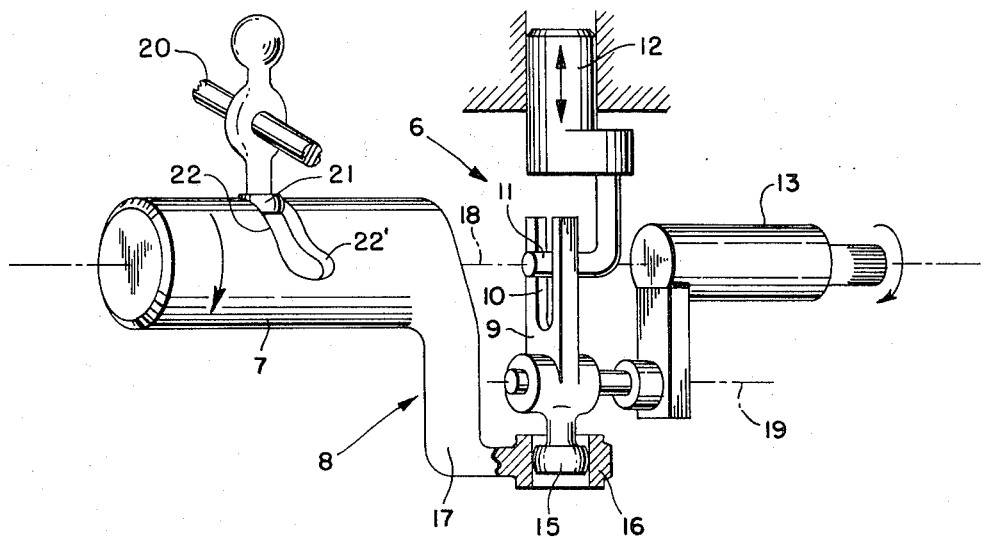
FIG. 5 is a schematic isometric view showing the various components of the authority change mechanism of FIG. 4.

In FIG. 5 there is schematically illustrated one form of rotary ratio change mechanism 6 which may be used in the authority change mechanism 8 of the present invention to amplify the input signal in the secondary mode by a relatively small factor of, for instance, four to three. The ratio change mechanism 6 is of relatively simple design and includes a transfer lever 9 having a longitudinally extending slot 10 in one end for receipt of a transverse arm 11 on one end of a ratio change mechanism actuator 12 which extends transversely into the slot 10. An input command is fed to the transfer lever 9 by rotation of an input shaft 13 suitably connected to the transfer lever adjacent the other end thereof. The input to the transfer lever 9 is transferred to the rotatable cam 7 by a ball joint 15 on the other end of the transfer lever 9 which extends into an annular sleeve or bushing 16 carried by a crank arm 17 attached to one end of the cam.

The ratio change mechanism actuator 12 is longitudinally movable toward and away from the transfer lever 9 to change the location of the ratio change mechanism actuator arm 11 within the slot 10 which provides a movable pivot point 18 for the transfer lever 9 whose distance to the input transfer axis 19 varies with the change in position of the ratio change mechanism actuator. As the distance from the pivot point 18 to the input transfer axis 19 is increased or decreased, the ratio of the input rotation to cam rotation is decreased or increased, respectively.

Figure 4:
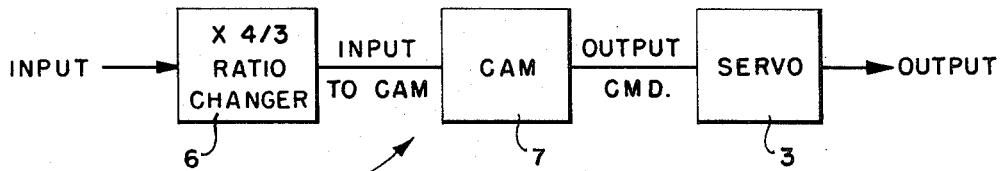
FIG. 4 is a schematic diagram of a preferred form of authority change mechanism constructed in accordance with this invention.
Figure 6:
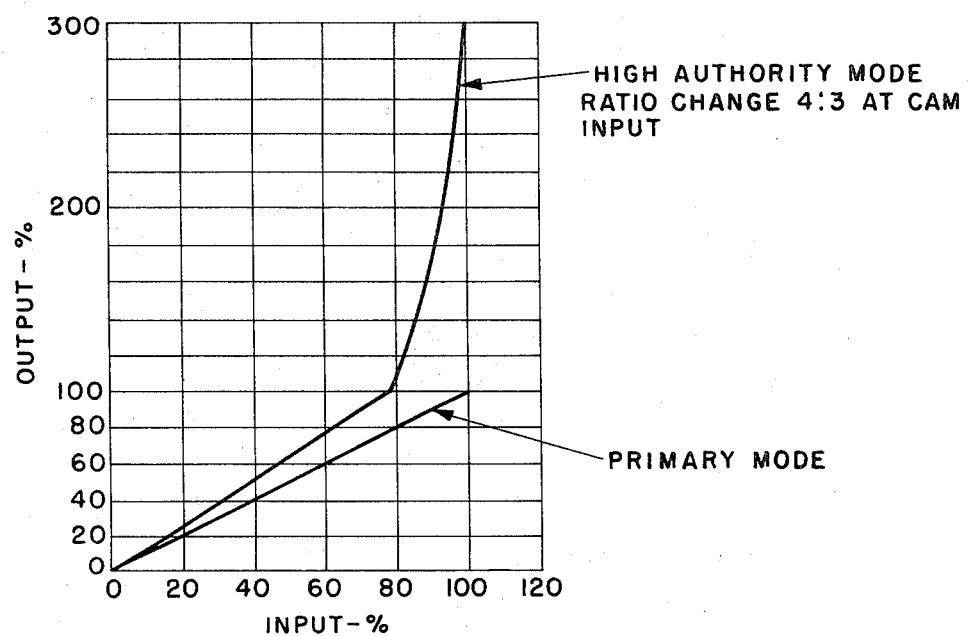
FIG. 6 is a graph showing the relative inputs and outputs obtained during the primary and secondary (high authority) modes of operation of the mechanism of FIGS. 4 and 5.

In operation of the authority change mechanism 8 of FIGS. 4 and 5, the output from the cam 7 is transmitted to an output shaft 20 by a cam follower 21 on the output shaft extending into a cam slot 22 in the cam. The configuration of the cam slot 22 may be such as to give the desired output command to the cam follower during the primary mode of operation. A preferred input to output displacement during the primary mode of operation is shown in the graph in FIG. 6 and may be identical to that for the primary mode of conventional authority change mechanism shown in the graph of FIG. 3. However, in the secondary mode, the output from the authority change mechanism 8 is illustrated in the graph of FIG. 6 as being much less than that shown in the graph in FIG. 3 for normal inputs because of the use of the much smaller ratio change mechanism 6, in this instance, having a ratio of four to three. This has the advantage that the output of the authority change mechanism 8 in the secondary mode does not exceed the maximum primary mode output authority until approximately 75 percent of the maximum input is commanded, and the control sensitivity of the secondary mode is only approximately 4/3 times that of the normal mode up to the 75 percent input command point, which is much better than the control sensitivity in the secondary mode of previous known authority change mechanisms of the type illustrated in the graph in FIG. 3.

Inputs beyond the 3/4 input point are not normally used during the primary mode of operation. Accordingly, beyond the 3/4 input point to the maximum input, the input to output ratio may be substantially increased during the secondary or high authority mode by extending the input range of the cam slot 22 at a greater angle to obtain the desired high output factor at high inputs, which is the only time that the operation in the high authority mode is critical. The portion 22' of the cam 22 from the 3/4 input point to the maximum input point is not used in the primary mode and has the characteristic of increasing the total output commanded by the desired higher factor of, for instance three, but only after the input exceeds 75 percent.

From the foregoing, it will now be apparent that the authority change mechanism of the present invention is of a relatively simple and reliable design which utilizes a relatively small ratio changer for better control sensitivity in the secondary mode during normal inputs up to a particular desired level, in this instance 75 percent. Beyond that point the cam design has the characteristic of increasing the total output commanded in the secondary mode by a much higher factor at a time when the high authority mode is critical.

The embodiments of the invention in which an exclusive property or privilege is claimed are defined as follows:

1. An authority change mechanism comprising an input shaft, a cam, an output shaft having a cam follower engaging said cam, and a relatively low ratio changer interposed between said input shaft and cam for slightly varying the functional relationship between input and output displacement of said input shaft and cam, respectively, to provide a primary and secondary mode of operation during inputs of less than 100 percent, said cam having an extended input range extending at a greater angle than the normal input range of said cam which provides a substantially greater variation in the functional relationship between input and output displacement in the secondary mode during higher inputs up to 100 percent.

2. The mechanism of claim 1 wherein said ratio changer includes means for amplifying the input signal by less than 1.5 to 1, and the angle of said extended input range of said cam is such that in the extended range said cam amplifies the input signal by a factor of at least two.

3. The mechanism of claim 2 wherein said ratio changer includes means for amplifying the input signal by approximately 4 to 3, and the angle of said extended input range of said cam is such that in the extended range said cam amplifies the input signal by a factor of approximately three.

4. The mechanism of claim 1 wherein said extended input range for said cam is above 75 percent input.

5. The mechanism of claim 4 wherein the maximum input in the primary mode does not exceed 75 percent.

6. The mechanism of claim 1 wherein said ratio changer includes means for causing the maximum obtainable output command in the primary mode to be achieved in the secondary mode at less than 100 percent input.

7. The mechanism of claim 6 wherein said ratio changer includes means for causing the maximum obtainable output command in the primary mode to be achieved in the secondary mode at approximately 75 percent input.

8. The mechanism of claim 1 wherein said ratio changer comprises a transfer lever having a longitudinally extending slot, a ratio changer actuator having an arm extending transversely into said slot, and means for moving said ratio changer actuator toward and away from said transfer lever to change the location of said arm within said slot which provides a movable pivot for said transfer lever.

9. The mechanism of claim 8 wherein said transfer lever is connected to said input shaft for rotation thereby, and said transfer lever is also connected to said cam for transferring the input from said input shaft to said cam.

10. The mechanism of claim 9 wherein said cam has a crank arm on one end which supports a sleeve, and said transfer lever has a ball joint thereon extending into said sleeve for transferring the input from said input shaft to said cam as aforesaid.

* * * * *